Jan. 24, 1961 W. M. GROSVENOR, JR 2,969,297
PURIFICATION OF BEET SUGAR SOLUTIONS
Filed June 22, 1959 10 Sheets-Sheet 3

INVENTOR
WILLIAM M. GROSVENOR, JR
ATTORNEYS

Jan. 24, 1961 W. M. GROSVENOR, JR 2,969,297
PURIFICATION OF BEET SUGAR SOLUTIONS
Filed June 22, 1959 10 Sheets-Sheet 4

INVENTOR
WILLIAM M. GROSVENOR, JR.
BY
ATTORNEYS

Jan. 24, 1961 W. M. GROSVENOR, JR 2,969,297
PURIFICATION OF BEET SUGAR SOLUTIONS
Filed June 22, 1959 10 Sheets-Sheet 5

INVENTOR
WILLIAM M. GROSVENOR, JR.
BY
ATTORNEYS

Jan. 24, 1961    W. M. GROSVENOR, JR    2,969,297
PURIFICATION OF BEET SUGAR SOLUTIONS
Filed June 22, 1959    10 Sheets-Sheet 6

INVENTOR
WILLIAM M. GROSVENOR, JR.
BY
ATTORNEYS

Jan. 24, 1961 W. M. GROSVENOR, JR 2,969,297
PURIFICATION OF BEET SUGAR SOLUTIONS
Filed June 22, 1959 10 Sheets-Sheet 7
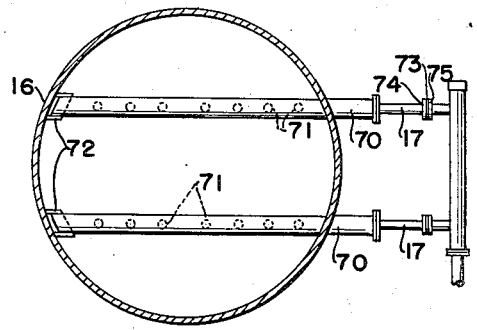
FIG. 11
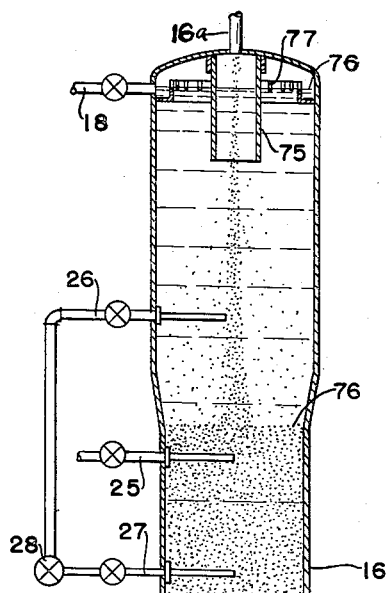
FIG. 10
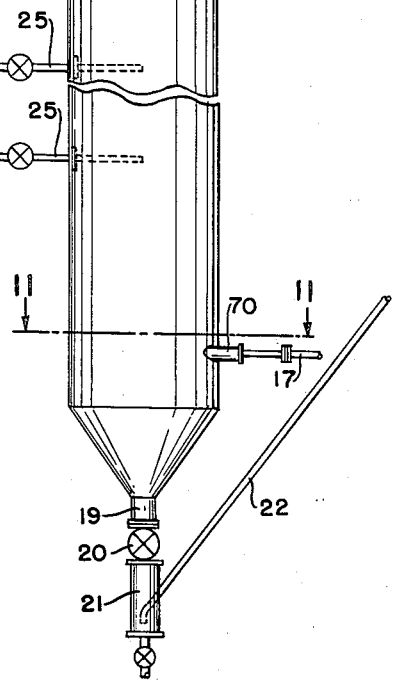
INVENTOR
WILLIAM M. GROSVENOR, JR.
BY
ATTORNEYS

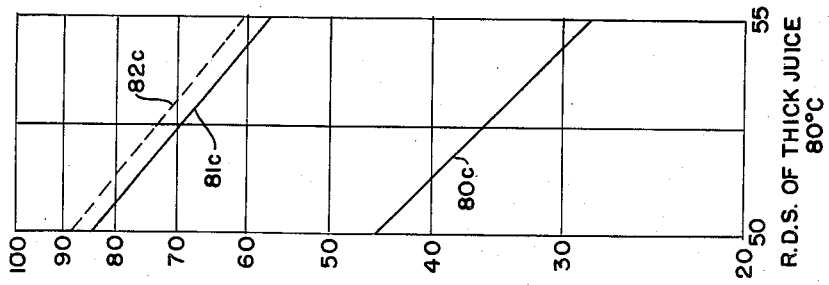
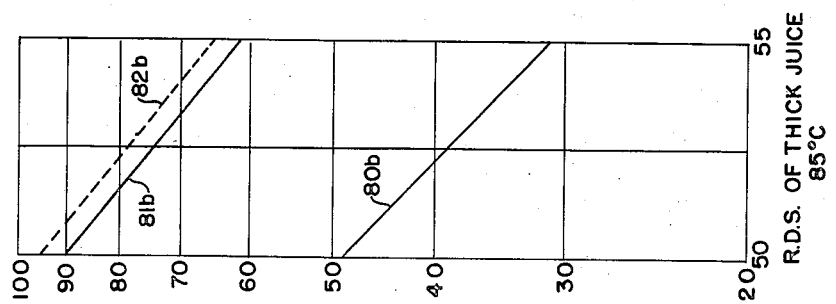
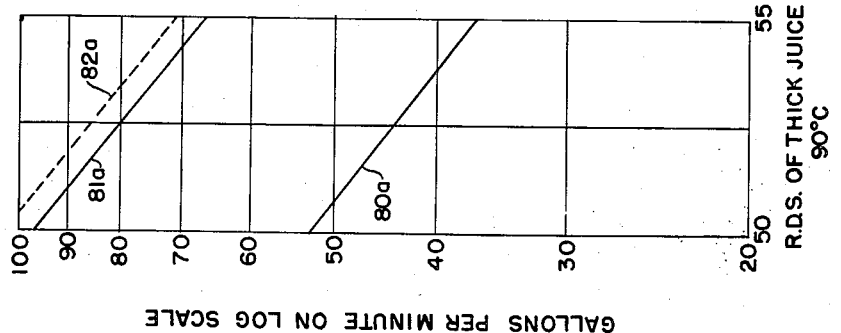

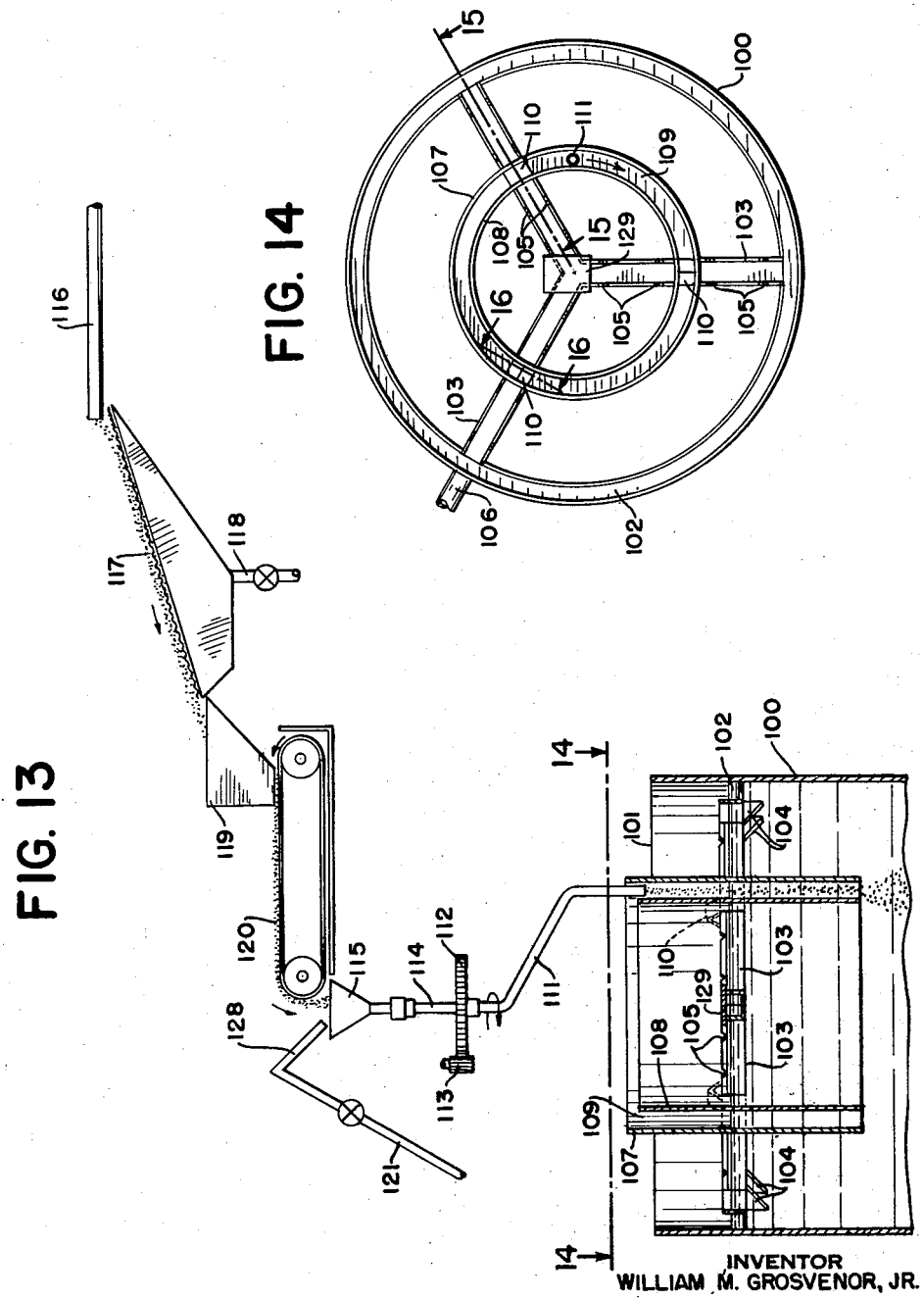

Jan. 24, 1961 W. M. GROSVENOR, JR 2,969,297
PURIFICATION OF BEET SUGAR SOLUTIONS
Filed June 22, 1959 10 Sheets-Sheet 10

INVENTOR
WILLIAM M. GROSVENOR, JR.
ATTORNEYS

United States Patent Office 2,969,297
Patented Jan. 24, 1961

2,969,297

PURIFICATION OF BEET SUGAR SOLUTIONS

William M. Grosvenor, Jr., Pelham, N.Y., assignor to The American Sugar Refining Company, New York, N.Y., a corporation of New Jersey Filed June 22, 1959, Ser. No. 821,945

4 Claims. (Cl. 127—55)

This invention relates to improvements in the refining of beet sugar solutions, and more particularly to the removal of floc-forming materials therefrom.

In the manufacture of beet sugar, the sugar is extracted from the raw beets with hot water and the resulting solution is treated with various reagents such as lime and carbondioxide to remove a portion of the impurities from the solution. The solution is then filtered and concentrated to around 55% sugar in multiple effect evaporators. The sugar liquor is then boiled to grain, the crystals dried and otherwise treated to produce a final crystalline beet sugar product.

While beet sugar so produced attains a purity of around 99.9%, it still contains impurities in sufficient amount to be of serious concern to many consumers as well as the sugar manufacturer. The impurities which are particularly objectionable are minute quantities of floc-forming materials which remain in the sugar liquors and in the sugar made therefrom.

The presence of floc-forming material in beet sugar becomes apparent only when the crystalline sugar is dissolved in water and the solution acidified. On standing, the floc-forming materials form a feathery solid or floc. The appearance or formation of such a flocculent precipitate has been the cause of great concern to both the bottling industry and to the sugar producers.

The floc formed gives an objectionable appearance to certain beverages and is thought to be responsible for some of the difficulties encountered in beverage carbonation. The flocculent precipitate forms in an acidified syrup or beverage on standing. In the bottling industry, the presence of the floc in the bottler's products is unsightly and suggestive of mold or bacterial contamination or other undesirable impurities. The presence of minute traces of floc-forming materials has seriously limited the sale of beet sugar products to the bottling industry.

This floc formation is a recognized problem, and studies have been made of the nature of the floc-forming materials and of methods of removing them. See, for example, "Floc in Carbonated Beverages," Industrial & Engineering Chemistry for 1952, vol. 44, pages 2844–2848. Proposals have been made for the elimination of floc-forming materials by the addition to the beet sugar solutions of carbonaceous adsorbents which are used once and are not regenerable, but such proposals result in imperfect elimination of floc, or are too expensive for economical operations.

The problem of floc-removal in beet sugar solutions is a different problem from that of decolorization of the solutions. The coloring matter in beet sugar solutions as commonly produced is of a nature such that special decolorization is not necessary before crystallization of the sugar therefrom.

The problem of floc removal from beet sugar solutions is a distinct problem. The reduction in floc-forming constituents, with incomplete removal, does not solve the problem. Even minute amounts of floc-forming material, amounting to a few parts per million, may result in objectionable floc formation when the sugar is used, e.g., in carbonated beverages.

The present invention provides an improved process of effecting removal of floc-forming materials from beet sugar solutions, thus making the resulting beet sugar readily available in the bottling and other industries where the floc problem has heretofore been a problem in the use of beet sugar.

The improved process of the present invention is not a decolorizing process with control of the color of the effluent liquor. But it is one advantage of the present process that not only are floc-forming materials removed, so that floc-free sugars can be boiled from the product liquor, but that there is a partial removal of color-forming and other non-sugar impurities to such an extent that savings of important economic consideration are achieved. The partial but incomplete removal of color and other impurities is such that an increased amount of sugar product of high purity is obtained, with reduction in the amount of remelting and reboiling and recrystallization of the sugar.

The improved process of the present invention also has the advantage that it does not result in the removal of ash from beet juices. And it is one of the advantages of the process that small amounts of ash constituents are retained which are beneficial in the use of the beet sugar, for example, for making hard candy, where strength of the sugar is important and where the use of beet sugar has advantages over the use of cane sugar.

The improved process of the present invention is a continuous countercurrent process in which beet sugar solutions containing floc-forming materials are passed upwardly through an expanded, downwardly-flowing bed of an activated granular regenerable carbonaceous floc-forming-material-adsorbent, with a sufficient length of countercurrent travel of the sugar solution and adsorbent, and with regulation of the flow of sugar solution and adsorbent to insure essential completion of the removal of the floc-forming material, as indicated by a zero floc test as defined below, at an intermediate portion of such countercurrent flow, and to insure a safe margin of travel of the sugar solution through the adsorbent above the point of such complete removal.

In the countercurrent flow of the sugar solution and adsorbent, a substantially lineal ascending column of the sugar liquor is contacted continuously by a lineally descending column of adsorbent, with a sufficient length of countercurrent travel, and with regulation of the rate of flow of the sugar solution so that the adsorbent bed is expanded from its fully settled state to an expanded state of from about 5% to 15%, but below the point of turbulence, and with a rate of addition and flow of the adsorbent to insure that the removal of floc-forming material takes place in the lower portion of the column to maintain a safe margin of countercurrent flow above the point of such complete removal.

The present process requires a different method of testing and control from that involved in the removal of other impurities such as color, where the process is controlled by testing of the effluent solution. In the present process, the control is effected by drawing off samples of the sugar solution at intermediate points in the countercurrent travel to determine that point at which essentially complete removal of floc is accomplished, by the zero floc test defined below, and to control the process so that this point of complete removal of floc-forming constituents is at an intermediate portion of the column.

Testing of the sugar solution at different portions of the column shows that the floc-forming constituents of the liquor are progressively removed from the bottom of the column until a critical point of complete removal is reached, which is referred to as the "break-through point."

The "break-through point" may be defined as that point in the countercurrent column at which essentially all of the floc-forming materials are removed and beyond which the sugar solution is free from floc-forming materials, i.e., a zero floc test as defined below.

The rate of flow of the hot sugar solution upwardly through the downwardly flowing adsorbent material is controlled to maintain the bed of adsorbent material in its expanded condition; but the continuous supply of adsorbent material is maintained to give a downward flow of the adsorbent at a rate which will insure that the break-through point is at an intermediate portion of the column, so as to leave a portion of the column above the break-through point to insure that at no time will the break-through point reach the top of the adsorbent bed. There is thus provided a safe margin, above the break-through point, to insure that the effluent is essentially free from floc-forming materials.

In order to insure proper control of the process, it is necessary that the testing procedure, for the presence of floc-forming materials, be applied to samples taken from the column at different heights to determine where the break-through point is, within limits, and to insure that this break-through point is well below the top of the adsorbent column.

The determination of the presence or absence of floc-forming materials in any given beet sugar solution is not a simple one. Tests for floc which can be quickly made may give a rough indication, but cannot be correlated with the floc content of the sugar boiled from the liquors. Accordingly, the testing of the liquors themselves is not entirely reliable. It is necessary to boil sugar from the liquors and to dissolve the sugar and test the resulting sugar solution. And this is a time-consuming operation. Nevertheless, by withdrawing samples at different points in the countercurrent column, and by making proper tests of these samples, the break-through point can be readily determined, with sufficient approximation, to enable the supply of adsorbent material to the top of the column to be controlled so as to maintain the break-through point at an intermediate point of the column.

The determination of the presence or absence of floc-forming materials in any given beet sugar solution, or in the solution drawn off at different levels of the countercurrent column, can only be truly established by "boiling strikes" of crystalline sugar from the liquors, centrifuging off the crystals, drying the same, and testing the solutions made from these crystalline sugars for floc formation after acidification to pH values approaching or below about 2.5. Heat has been found to hasten the process of floc formation.

Since the floc-forming materials are present in sugar to an extremely minute extent, measured in parts per million, one difficulty has been to obtain an evaluation of the extent of their presence. The following test has been established to show not only the presence or absence of floc-forming materials in the solid sugar, but also to provide a method of grading their relative concentrations of the floc-forming material.

The following procedure has been found to work satisfactorily: (1) Place 70 grams of the sugar to be tested in an 8 oz. bottle. Use round, medium tall, wide mouth flint glass bottle with molded screw cap and a Vinylite liner. (2) Add 163 ml. of distilled water at room temperature and stir to dissolve the sugar. (3) Acidify to 2 pH with C.P. phosphoric acid. (4) Fit cap loosely on the bottle and place bottle in a briskly boiling distilled water bath equipped with a close fitting cover and continue boiling for 15 minutes with bath covered. A 1½ quart Revere Ware kettle with lid has been found to make a suitable bath. (5) At the end of 15 minutes' time in the boiling water bath, remove bottle and tighten the cap and set aside for observation. Do not shake or disturb sample after placing aside for observation. (6) Inspect for floc after 4 hours and 24 hours. Observations are made by shining a strong pencil beam of light through the solution towards the observer. An American Optical Co. No. 353 Universal microscope illuminator or equivalent has been found to be suitable.

The flocculating tendency is rated as follows:

0, when no floc is visible at 24 hours.

1, when light floc is visible after 24 hours but none after 4 hours.

2, when heavy floc is visible after 24 hours but none after 4 hours.

3, when light floc is visible after 4 hours.

4, when heavy floc is visible after 4 hours.

It has been found that only sugars with a flocculating tendency rating of 0 will be suitable for the bottling trade as "floc-free" sugars, and one object of this invention is to provide a process to produce such sugars.

The zero floc test, as determined by the above procedure, is used as a test for indicating completion of the removal of floc-forming materials to the point where the sugar produced from the liquor is satisfactory for use in the bottling industry and is, for practical purposes, a floc-free sugar. And by maintaining the break-through point, as determined by this zero floc test, at an intermediate portion of the countercurrent column, and well below the top of the adsorbent column, a floc-free sugar can be continuously obtained from the top of the column.

It is recognized that the thirty-odd hours which it is necessary to wait to determine whether the effluent sugar solution from the treatment is free from floc poses a serious control problem in order to produce "floc-free" sugar.

For operating purposes, and subject to checking by the above test, the samples of sugar solution drawn off from the different portions of the column can be directly tested by the hot phosphoric acid visual method using samples diluted to around 30 R.D.S. (refractometrically determined solids) prior to testing for floc-formation. While these tests cannot be relied upon without checking by the above method, they are sufficiently indicative of the reduction in floc formation at different levels in the column to give an approximation of the point of complete removal and to indicate any tendency of the break-through point to rise in the column. By making a series of tests of samples of sugar solution drawn off from different points of the column and by testing indirectly and checking the tests by the above method, it is possible to provide a general operating guide and to determine the approximate location of the break-through point. And it is possible, by regulating the speed of adsorbent material, to maintain the break-through point at an intermediate portion of the column and sufficiently below the top of the adsorbent bed, so that a sufficient margin of flow above the break-through point can be obtained to insure that at no time does the break-through point reach the top of the adsorbent column.

At the bottom of the counter-current column, where the sugar solution enters, the adsorbent will become saturated or practically so with floc-forming materials, and the process is advantageously operated so that the exhausted adsorbent withdrawn from the bottom of the column has been used to its maximum floc-forming-material removal capacity. With a column of sufficient height of countercurrent flow, the break-through point can be readily maintained at an intermediate portion of the column, for example, at about midway of a 30-foot high counter-current column, and in any event well below the top of the expanded adsorbent bed.

The beet sugar solutions which are to be freed from floc-forming materials are passed upwardly through the countercurrent column at elevated temperatures of around 70°–96° C., and advantageously in the range of 80°–96° C., which results in better operation of the process than at lower temperatures in the 70° range. The sugar solutions are preheated before they enter the column and are maintained at the proper temperature in the column by insulation or by heating means.

While the process can be applied to thin beet sugar liquor, it is more advantageous to apply it to the thick juices from the evaporators, or the standard liquor containing remelt. The floc-removing treatment is thus advantageously carried out at that stage of the process at which the thick juices emerge from the evaporator, using the thick juices either alone or in admixture with sugar solutions made by remelting some of the sugar products subsequently formed in the process.

The granular, adsorbent, carbonaceous material used in the present countercurrent process is a regenerable carbonaceous floc-forming-material-adsorbent such as is obtainable from coal and such as has heretofore been proposed for use in the decolorizing of corn and other sugar solutions. The activated granular carbon can thus be made by briquetting powdered coal with a coal tar binder, granulating the briquets to the desired size, and calcining in a furnace at around 900° C. in the presence of controlled amounts of steam and air for activation. Such granular carbon has the advantage that it can be regenerated by recalcining.

Such a carbon which has been found well suited for use is the carbon available on the market as Pittsburg granular activated carbon-type CAL, obtainable from Pittsburgh Coke & Chemical Corporation, and having the following properties:

Apparent density—
  Gr./cc. _____ .44
  Lbs. c. ft. _____ 27.5
Particle density (Hg displacement) gr./cc._____ .7
Real density (He displacement), gr./cc. _____ 2.1
Pore volume (within particle), cc./gr. _____ .94
Voids in dense packed column, percent _____ 38.
Specific heat at 100° C. _____ 0.25
Total surface ($N_2$ BET method), m.$^2$/gr. __ 1000–1100
Mesh size, U.S. sieve (with not more than 5%
  over 12 mesh or below 40 mesh) _____ 12 x 40
Mean particle diameter, mm. _____ 0.90–1.10
Iodine number, minimum _____ 1000
Molasses, number, minimum _____ 230
Ash, maximum, percent _____ 8.5
Moisture as packed, maximum, percent _____ 2.0
Abrasion number, minimum _____ 75

It has sometimes been found advantageous to use such a granular carbon in conjunction with some means of pH regulation such as by the addition of up to 10%, usually about 5% by weight, of dead-burned magnesite, to reduce the tendency of the granular carbon to lower the pH of the sugar liquor to a point where inversion of sucrose becomes objectionable. The pH of the sugar solution in the process is advantageously maintained at a pH of around 7 to 8.

In the commercial operation of the process, the countercurrent column may have a size e.g. of 8 to 10 feet in diameter and 30 to 40 feet in height, with a distance of countercurrent flow of the sugar solution of 25 to 30 feet. In such a column, the sugar solution is introduced near the bottom, but above the bottom, so that there will be a zone for the collection of the adsorbent to be removed from the column below the countercurrent zone.

In order to obtain uniform columnar counterflow in the column, it is important to obtain uniform distribution of the sugar solution at the inlet level over the cross-sectional area of the column. This can be accomplished by causing the sugar solution to enter the column through a multiplicity of orifices of uniform size and of such size that a pressure drop of the order of 5 pounds per square inch occurs across the orifice and with the orifices so spaced, for example, that one orifice serves about 0.5 to 1.0 square foot of the column cross-section.

These orifices, through which the sugar solution is introduced, can be disposed in a plate bed with a plenum chamber below it, but it is sometimes more advantageous to have the orifices in sparger pipes, with the orifices discharging downwardly. The orifices will be a small fraction of an inch in size and should be surrounded by a much larger diameter cylindrical shield, and so arranged as to prevent the adsorbent from being washed back into the orifices when the column is shut down.

The spargers can also be placed within a slotted pipe with the slot also pointing down, and with the slotted pipes welded to the column sheath, and with provision to withdraw the spargers from the slotted pipes for cleaning. By providing liquor-tight seals at one end, the sparger pipes can be withdrawn and the orifices cleaned without removing the adsorbent in the column.

If a plate, and plenum chamber below the plate, are used, the orifices through the plates should be protected from the adsorbent back-flow by having them discharge into tubing, of about five orifice diameters, which are bent through 180° so that they discharge downwardly. If spargers are used, the manifold connections should be provided with orifices to insure even liquor flow to the various spargers.

It is important not only to insure uniform distribution of the entering sugar solution over the cross-sectional area of the column, but also to provide for even cross-sectional removal of the adsorbent from the bottom of the column, so that there will be a uniform discharge and uniform downward flow of the adsorbent over the cross-sectional area of the column.

The travel of the adsorbent through the column may be considered to be divided into different types of travel. Above the point of sugar solution inlet, the travel of the adsorbent downwardly is one in which the settling is hindered by the upward flow of liquor to maintain an expanded bed. Below the point of introduction of the sugar solution, the travel of the adsorbent is a forced settling, aided by the flow of liquor, to aid in removing the adsorbent from the bottom of the column.

To remove the adsorbent at a controlled rate from a collection point or points at the bottom of the column, it is advisable to form it into a fluidized slurry, increasing the velocity of liquor flow to a point where this velocity materially exceeds the settling velocity of the adsorbent in the liquor.

It is also important to supply the adsorbent at the top of the column at a regulated rate and with uniform distribution of the adsorbent over the cross-sectional area of the column. The top of the bed of adsorbent material is maintained some distance below the overflow of liquor from the top of the column, so as to maintain a body of purified sugar solution in the top of the column, through which the adsorbent can enter the sugar solution and be distributed over the surface of the adsorbent bed. The adsorbent may thus be divided into a multiplicity of equal streams, each supplying a portion of the cross-sectional area of the column through confined spaces or soaking zones, which afford an opportunity for the dry adsorbent to wet out and lose its gaseous content and sink to become part of the bed, without being carried out of the column in the effluent stream. If the adsorbent is transported to the top of the column in a liquid carrier, such as floc-free sugar solution, the resulting slurry can also be supplied and distributed over the cross-sectional area of the column.

It is also important to remove the floc-free sugar solution effluent from the top of the column in a manner to insure that the liquor maintains its vertical flow and does not tend to flow in part or entirely to one side of the column.

In order to determine where the top of the bed of adsorbent is located in the column, suitable means can be provided. One means of doing this is to utilize the fact that there is a definite pressure drop, above that of the hydrostatic head, where the liquor passes upward through and in part supports the solid settling adsorbent. By disposing pressure taps vertically up the side of the column and by interposing between adjacent taps a differential pressure cell so calibrated that the difference in hydrostatic heights of the taps is "zeroed" out, the pressure drop across the taps when the bed top lies between them, can be read on the differential pressure cell. This provides one means of indicating whether there should be increased or decreased adsorbent feed. The rate of take-off of adsorbent from the bottom of the column should correspond to that which is added at the top of the column. Other means can be provided for locating the top of the bed of adsorbent in the column, such as by electrically measuring the resistance to the rotation of a slow speed electrically driven paddle-shaped rotor located inside the column, which will indicate the entrance of the bed level into its zone of activity; or by a sight glass or window in the side of the column.

In the starting up of a column, before floc-free sugar is produced, the effluent from the column should be recycled until tests of samples drawn off from the column show that the break-through point has been established and is maintained at an intermediate portion of the column. After the column is in continuous operation and is producing floc-free sugar solution, the process will be controlled by similarly taking off samples from different heights in the column to insure that the break-through point is maintained at an intermediate portion.

Different sugar solutions vary somewhat in their floc-forming constituents. With sugar solutions containing increased amounts of floc-forming constituents, an increased rate of supply of the adsorbent is provided to maintain the break-through point at a safe margin below the top of the adsorbent column. While there may be considerable fluctuation in floc-content of sugar solutions at different seasons, the amount of floc-forming material from day to day does not greatly vary. With a column of e.g. 30 feet in height of adsorbent bed and with a floc-free point maintained at midway of this bed, there is a sufficient margin above the break-through point to take care of normal changes in floc-forming content in the liquor from day to day, and until testing indicates a need for increased or decreased feed of adsorbent to the top of the tower to maintain the break-through point safely below the top of the column.

The exhausted adsorbent material discharged in the form of a slurry at the bottom of the tower will contain more or less sugar solution and is treated to remove this sugar solution therefrom before the adsorbent is regenerated for further use. It may first be subjected to a filtering treatment to free it from excess sugar solution, which can be returned to the process, and the filtered adsorbent then subjected to a de-sweetening treatment to remove the adhering sugar therefrom. Alternatively, the slurry of sugar solution and adsorbent may pass directly to a column where it is subjected to a de-sweetening treatment.

This treatment of the adsorbent to remove sugar therefrom is advantageously carried out in a countercurrent column with the filtered adsorbent, or slurry of adsorbent and sugar, entering the top of the column, and fresh hot water entering the bottom, and with counter-current flow of the adsorbent down through the column and upward flow of water therethrough. This countercurrent washing of sugar from the adsorbent gives a sweet-water of relatively high sugar content and insures substantially complete washing of sugar from the adsorbent.

The adsorbent, after thus freeing it from sugar, is dried and subjected to regeneration for reuse. It may thus be dewatered by a filter and the dewatered adsorbent dried and fed to a regenerator, which may be a rotary kiln or a multi-hearth furnace, where the adsorbent can be heated to from 1400° F. to 1800° F. to regenerate it in a controlled oxidizing atmosphere.

The regenerated adsorbent is either cooled dry, screened to remove trash and returned mechanically to the feed of the countercurrent column; or it is quenched in water, screened wet, and transported hydraulically for dewatering and slurrying with column effluent; or it can be cooled and slurried with column effluent and transported hydraulically to the top of the column.

The apparatus that is used in carrying out the present process is advantageously made of a corrosion resisting material, such as stainless steel.

The invention will be further described in connection with the accompanying drawings, showing a flow sheet of the process, and apparatus suitable for carrying out the process of the invention, but it will be understood that the invention is not limited thereto.

In the accompanying drawings

Fig. 10 shows, partly in section and partly in elevation, a form of desweetening column.

Fig. 11 is a section taken on the line 11—11 of Fig. 10 showing the inlet piping for this column.

Figs. 12a, 12b and 12c illustrate flow rates in the column and under the conditions hereinafter described.

Fig. 13 shows a modified form of construction of the top of the countercurrent column, and a modified form of supply of the adsorbent thereto.

Fig. 14 is a top view of the column of Fig. 13 from the line 14—14 of Fig. 13.

Figure 1:
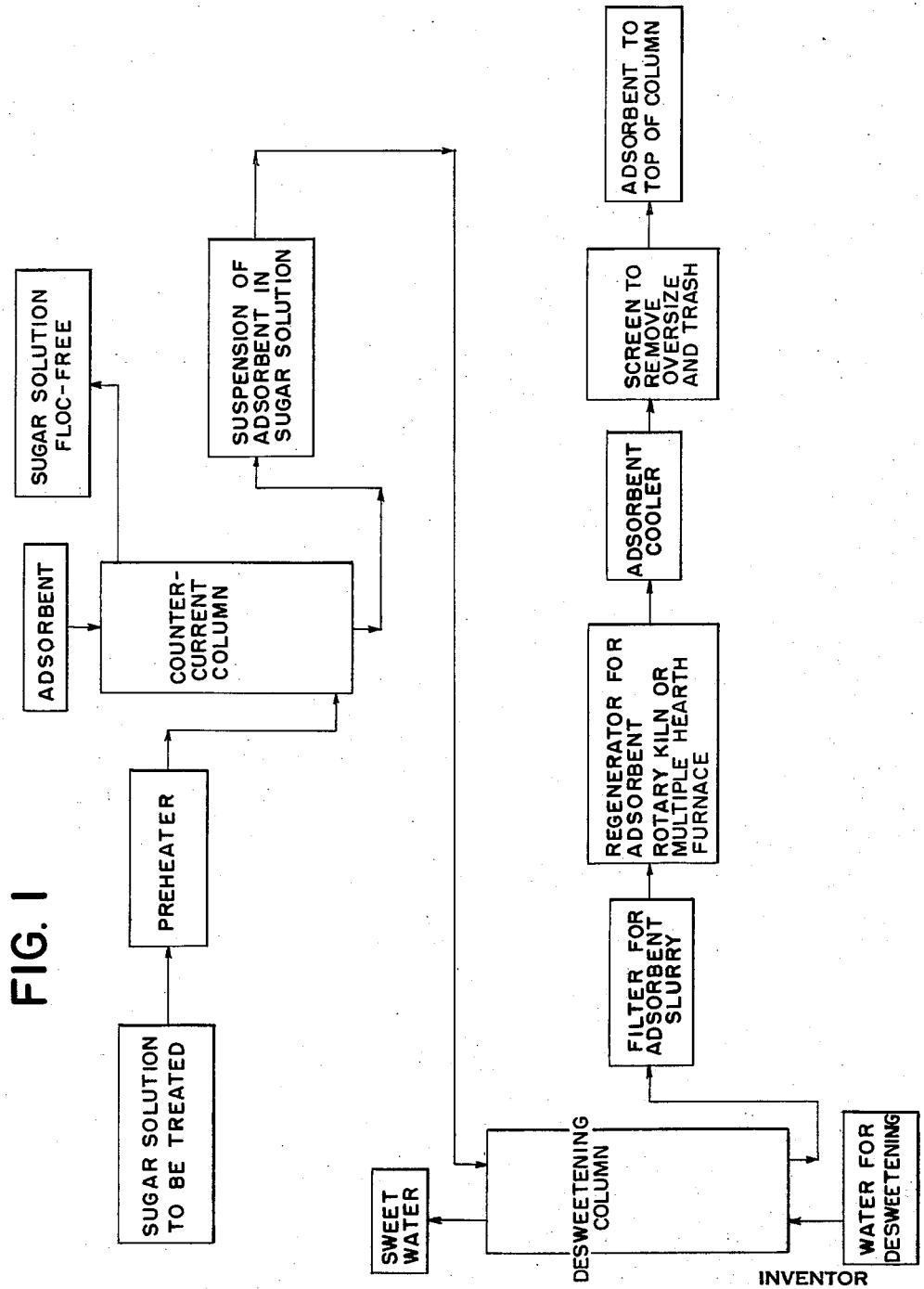
Fig. 1 is a flow sheet illustrating the process.

In the flow sheet of Fig. 1, the beet sugar solution to be treated and freed from floc-forming materials is shown as passing through a preheater for preheating it to the temperature to be maintained in the countercurrent column, and this preheated solution is then passed into the bottom of the column and upwardly therethrough in columnar form, countercurrent to the downwardly flowing adsorbent added at the top of the column. The spent adsorbent is removed from the bottom of the column in the form of a suspension in sugar solution and is passed to the top of the desweetening column, into which water for desweetening enters at the bottom, and from which the sweet water escapes at the top. The adsorbent from the bottom of this column is passed in the form of a slurry to a filter, for freeing the adsorbent from most of its water, before it passes to the regenerator for the adsorbent, which may be a rotary kiln or multiple-hearth furnace. The regenerated adsorbent is then shown as passing to a cooler and then over a screen to remove over-size and trash, to give the adsorbent in a form ready for return to the top of the countercurrent column.

Figure 2:
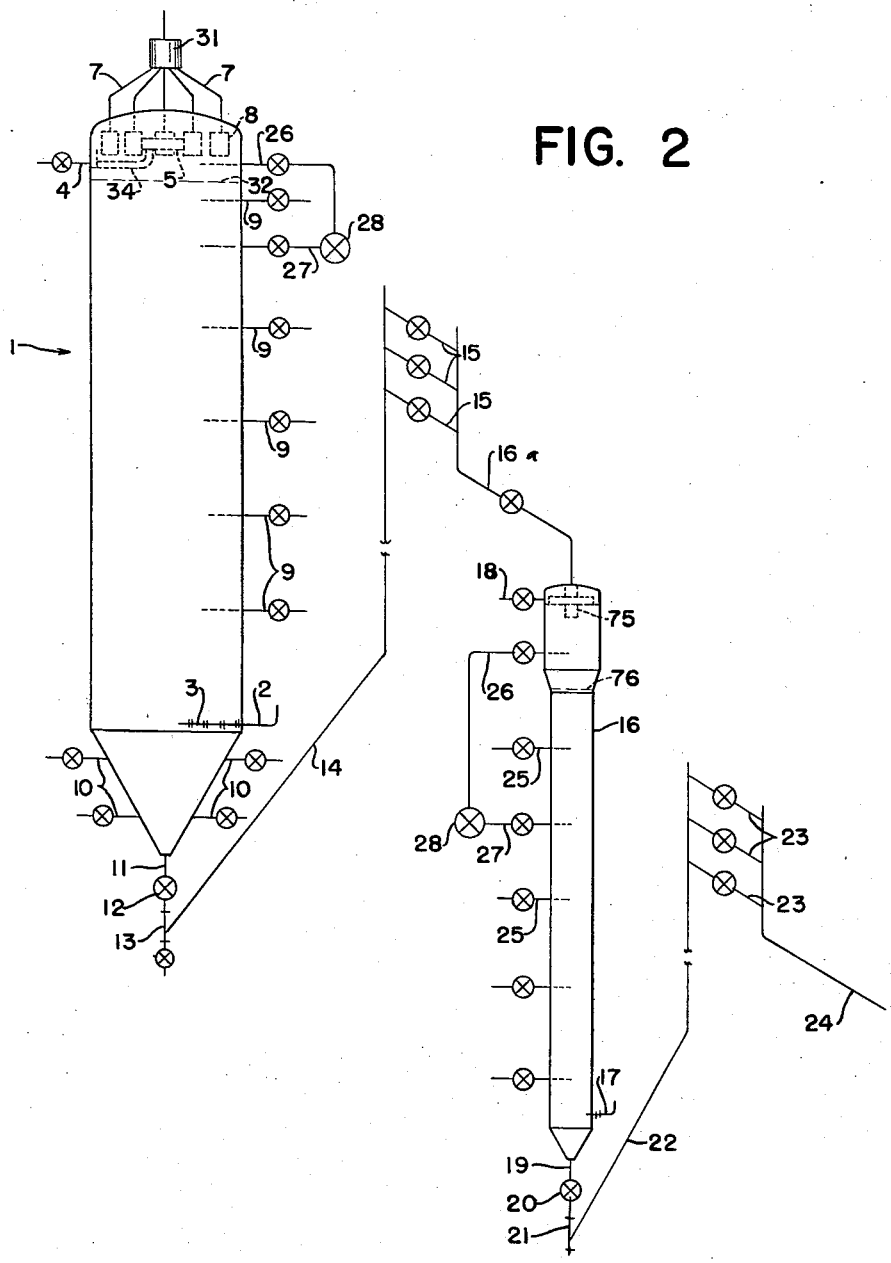
Fig. 2 shows, in a somewhat conventional and diagrammatic manner, an arrangement of the countercurrent column and desweetening column.

The countercurrent column is shown in a conventional manner in Fig. 2 and in more detail in Figs. 3–9. This countercurrent column 1 is a cylindrical column of e.g., 9½ feet in diameter and of a height to maintain an expanded bed of adsorbent of around 25–40 feet in height. This column is provided with insulation and heating means (not shown).

Figure 4:
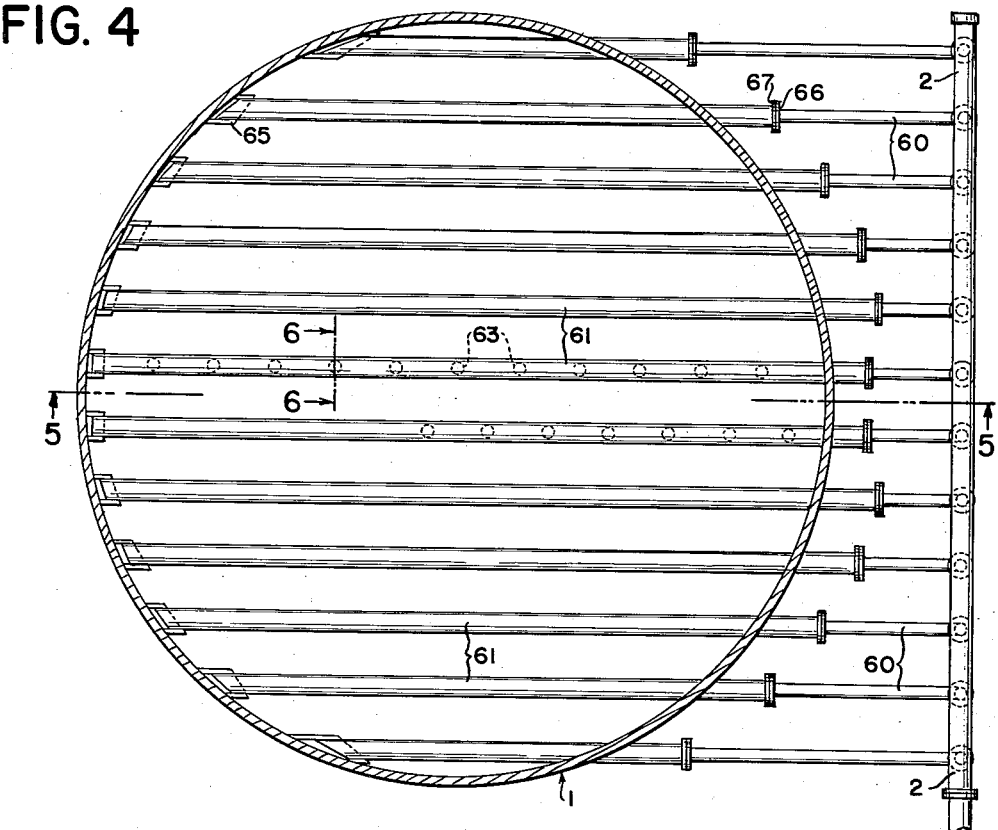
Fig. 4 is a section on the line 4—4 of Fig. 3 showing the inlet piping for the sugar solution.
Figure 5:
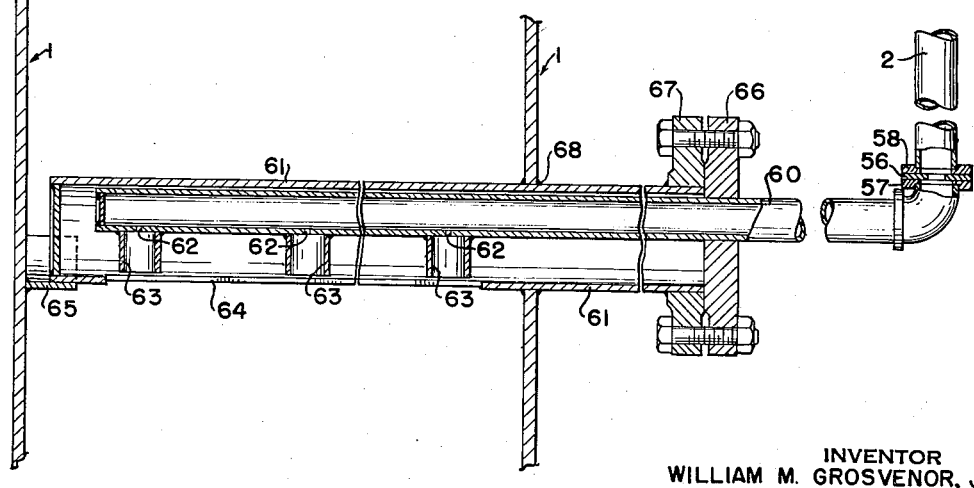
Fig. 5 is an enlarged sectional view, with parts broken away, taken on the line 5—5 of Fig. 4.

The column has a sugar inlet 2 near, but somewhat above, the bottom of the column, leading to distributing pipes 60, shown more particularly in Figs. 4 and 5. Near the top of the column is the purified sugar outlet pipe 4 connected with the overflow device 5 and the trough 6, shown more particularly in Figs. 7 to 9.

The adsorbent for removing floc-forming materials is fed through a series of lines 7 to the top of the column and passed downwardly through a series of soaking chambers 8, and then downwardly through the body of sugar solution above the expanded bed to the top of this bed, indicated at 32. The lines 7 are inclined at a sufficient angle to permit free flow of the adsorbent therethrough.

On the side of the column 1 are several sample lines 9 extending into the column to permit samples of sugar solution to be taken out at different levels for test purposes.

The portions of the sample lines inside the column have inlet openings for drawing off the sugar solution. And each of these sample lines is surrounde by a screen (not shown), to prevent escape of adsorbent with the sugar solution.

From the conical bottom of the column 1, line 11 permits discharge of the char slurry in a manner hereafter described, and this slurry passes through the pipe 14, to a series of crossover pipes 15, located at different levels and each provided with its own control valve so that, by opening one or another of these valves, the discharge level of the slurry can be controlled and the differential level from the top of the liquid in the column 1 and the slurry overflow regulated.

The slurry passes through the line 16a to the top of the desweetening column 16.

The desweetening column 16 has water inlet pipe 17 near the bottom, shown in Fig. 11. The top of this column has a sweetwater outlet 18, leading from a collecting trough 70 shown in Fig. 10. The spent adsorbent enters the top of this column through the line 16a, and the slurry of bone char and water passes from the bottom of the column through the line 19 and upwardly through the line 22 to a series of crossover lines 23, by which the overflow level is controlled and the differential height between the liquor level in the column 16 and the overflow line regulated.

The slurry of adsorbent then passes through the line 24 to a filter such as illustrated conventionally in Fig. 1.

Only one countercurrent column 1 is shown in Fig. 2. Two or three such columns of similar construction can be arranged to operate in parallel and with discharge of the spent adsorbent from all of these columns in slurry form into the same desweetening column.

Fig. 2 is not intended as a scale drawing, and the location or elevation shown for the crossover pipes 15 and 23 is not intended to illustrate the actual location or elevation which in each case will be determined by the differential head between the liquid level in the column or tower and the crossover line, to insure proper flow of the slurry from the bottom of the tower or column to the crossover line.

The column construction is illustrated in more detail in Figs. 3 to 9.

Figure 3:
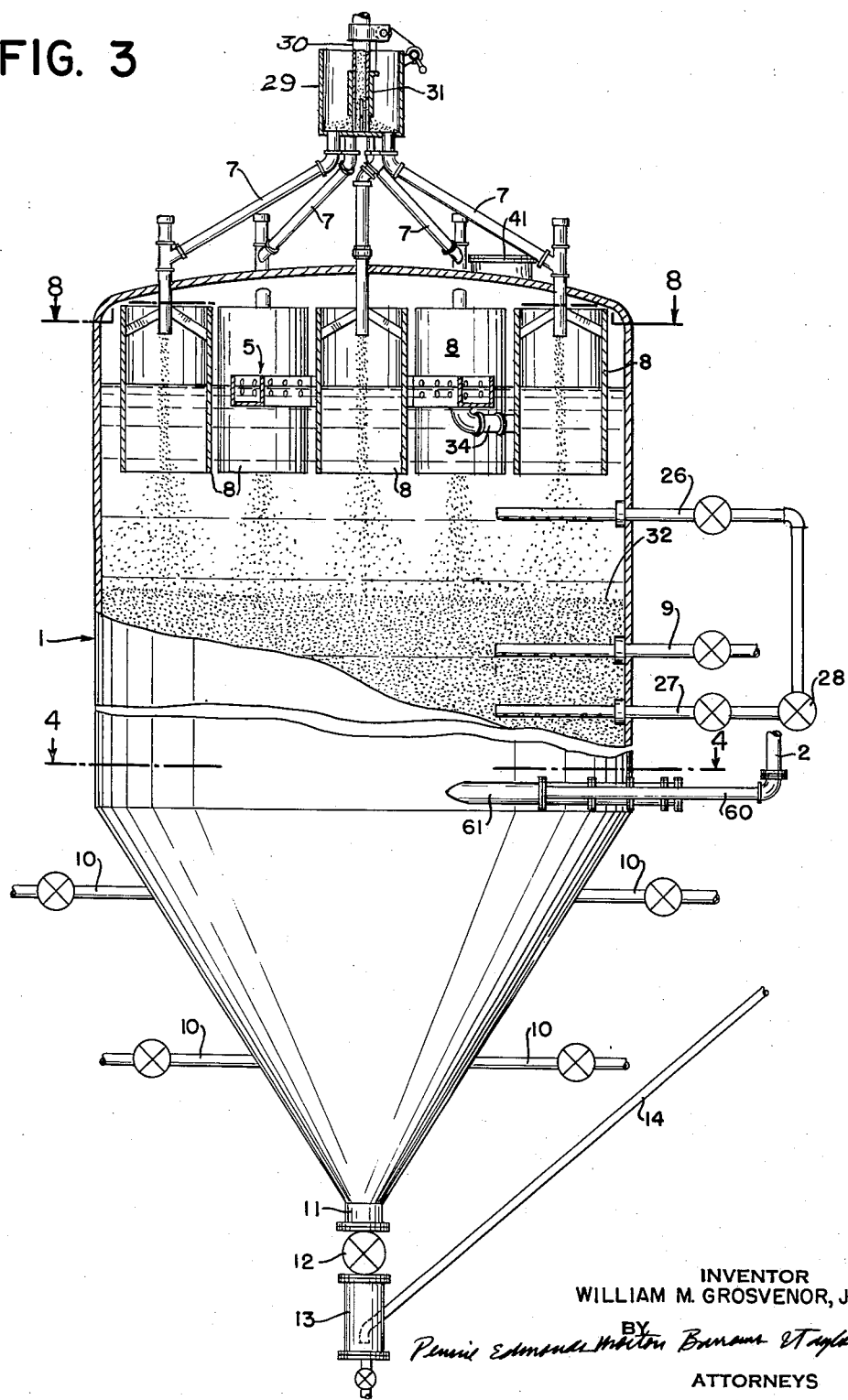
Fig. 3 shows the top and bottom of the countercurrent column, partly in central vertical section and partly in elevation, with the middle portion broken away.

Referring to Fig. 3 the bone adsorbent is supplied through the line 30 which has a series of slots at its lower end surrounded by the sliding sleeve 31 which is adjustable to different levels to permit increase or decrease of the amount of adsorbent supplied through these slots to the chamber 29, from which the adsorbent is fed to the supply lines 7 and the soaking chambers 8. The soaking chambers 8 are supported by brackets from the lower ends of the pipes 7. The soaking chambers extend some distance down into the sugar solution, so that the dry adsorbent will pass downwardly into and through the soaking chambers and be freed from air, and will spread out and pass downwardly, through the rising sugar solution, to the top of the expanded bed indicated at 32.

Figure 7:
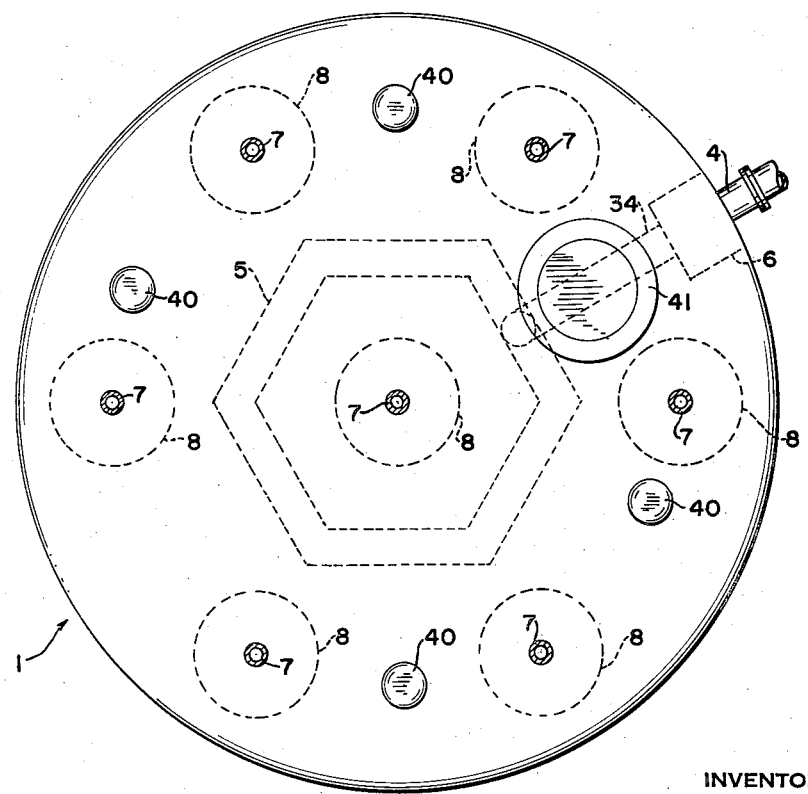
Fig. 7 shows the top view of the column.
Figure 8:
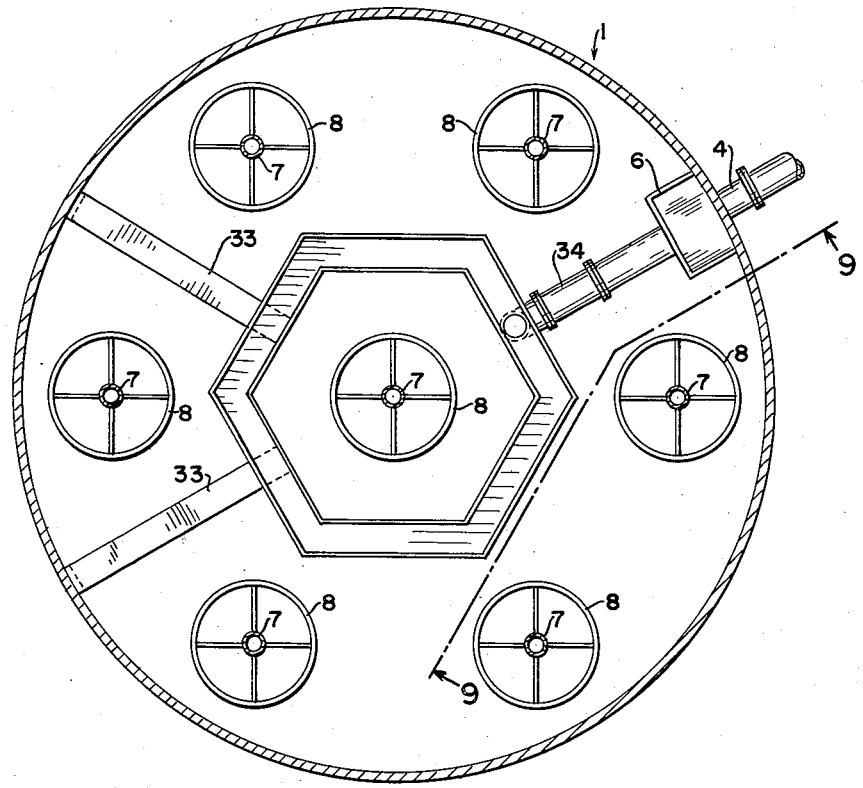
Fig. 8 shows a section through the column taken on the line 8—8 of Fig. 3.
Figure 9:
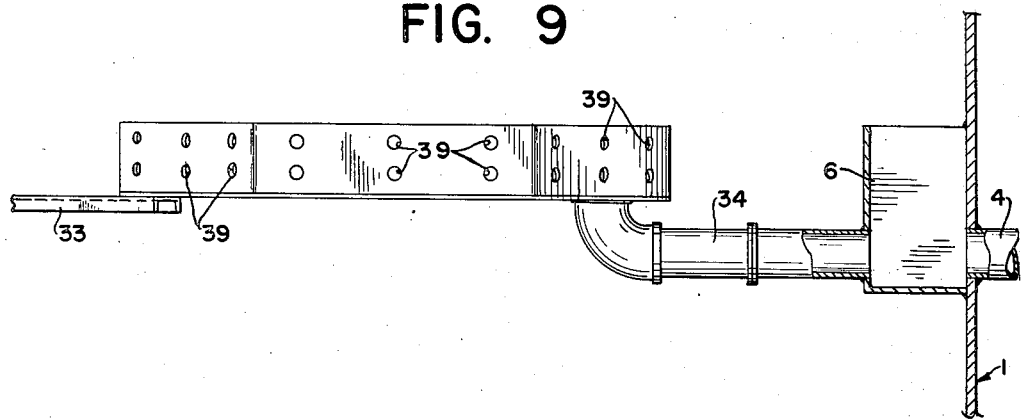
Fig. 9 is a view taken on the line 9—9 of Fig. 8 showing the overflow chamber and draw-off.
Figure 15:
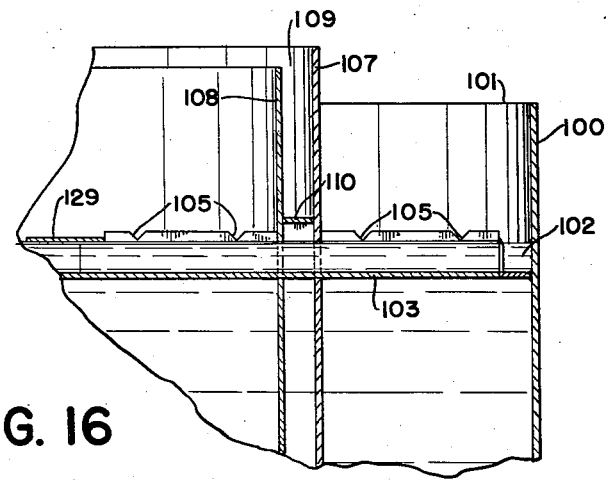
Fig. 15 is an enlarged section taken on the line 15—15 of Fig. 14.
Figure 16:
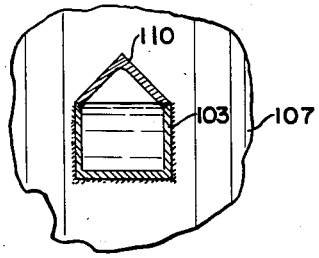
Fig. 16 is an enlarged section taken on the lines 16—16 of Fig. 14.

The overflow device 5 shown in Fig. 3, and in Figs. 7, 8, and 9, is a trough, hexagonal in shape, supported by brackets 33 and from the wall of the column and connected with the trough 6 by the line 34. The overflow trough 5 has two series of holes 39 located at different levels, both on the inside and the outside of the trough. The level of sugar solution will vary somewhat, and in general will be at or above the lower row of holes 39. As the level rises to the upper series of holes, there is an additional overflow to maintain the liquid level from rising materially above the upper row of holes.

Provision is made for observing or locating the top of the expanded bed within the column. This column can be observed through a sight glass or window (not shown) located in the side of the column. The device illustrated in the drawing for this purpose is a differential pressure cell 28 connected with two pressure taps or pipes 26 and 27 extending into the column, and with the pipe 26 located in the liquid space above the expanded bed. By calibrating the differential pressure cell 28 so that the difference in hydrostatic height between the two tap pipes 26 and 27 is "zeroed" out, the pressure drop across the taps, when the bed top lies between them, can be read on the differential pressure scale. This pressure drop is due to the resistance to upward passage of the liquor through the solid settling adsorbent. The measurement of this pressure drop provides one indication of the need of increasing or decreasing the adsorbent feed, if the bed level falls or rises.

At the top of the column, as shown in Fig. 7, are openings 40 through which testing devices can be introduced to check on the level of the expanded bed. A manhole 41 is also shown in the top of the tower.

The bottom of the countercurrent column 1 is conical in shape and leads to outlet pipe 11 which is connected through the full opening valve 12 to a lower cylinder from which the upwardly extending pipe 14 carries the slurry of adsorbent in sugar solution to the crossover pipe 15. A series of inlet pipes 10 are arranged in the conical bottom to inject additional sugar solution, when necessary to maintain the spent adsorbent in a sufficient state of fluidity.

The arrangement of the sugar inlet pipes, indicated conventionally at 3 in Fig. 2, is shown in more detail in Figs. 4 and 5. The header 2 for the incoming hot sugar solution is connected with a series of branch pipes 60 extending into and across the bottom of the column, and each of these pipes is surrounded within the column with a larger outer pipe 61. Each of these pipes 60 has small openings 62 spaced apart equal distances, and is surrounded by a downwardly extending cylindrical pipe 63. The larger outer pipes 61 have a longitudinal slot 64 shown in Figs. 5 and 6, this slot being of a width equal to the diameter of the depending cylindrical pipes 63 attached to the smaller pipe 60. The larger pipes are supported at their far ends by brackets 65 on the side of the column and, near their inlet ends are welded to openings 68 in the side of the column 1. Flanges 66 are welded to the inlet pipe 60, and similar flanges 67 are welded to the larger outer pipes 61, and these are bolted together as shown in Fig. 5.

The pipes 60 vary in their length within the column and in the number of outlet openings. In order to regulate the supply and pressure in these different pipes flange orifices 56 are located between flanges 57 and 58 in each of the pipes 60. These orifices are predetermined and regulated to insure a proper and uniform supply of the hot sugar solution and discharge of the solution from the different openings of the series of supply pipes in a substantially uniform manner over the cross-sectional area of the column.

The arrangement of the inlet pipes and of the supply of sugar solution thereto is thus such as to insure uniformity of pressure and discharge through the different orifices downwardly near the bottom of the column. The arrangement of the sugar solution outlets is such as to protect them from interference with the downwardly flowing adsorbent material.

The desweetening column 16, shown in Figs. 10 and 11, has a depending cylindrical inlet member 75 extending downwardly from the entrance of the spent adsorbent slurry, through the line 16a, this cylindrical portion extending downwardly some distance below the normal liquid level of the column. Near the top of this column is an overflow trough 76 with overflow notches 77 for the overflow of the sweet water from the column into the overflow trough, and thence out through the sweetwater outlet 18.

Figure 6:
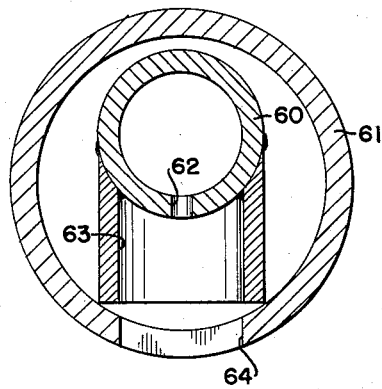
Fig. 6 is an enlarged view through one of the inlet pipes taken on the line 6—6 of Fig. 4.

At the bottom of the desweetening column, water enters through a series of pipes 17 surrounded by larger outer pipes 70 supported at their inner ends by brackets 72 and having openings and downwardly extending pipes surrounding these through which water is introduced. The construction and arrangement of these inlet pipes is similar to that of the sugar solution inlet pipes at the bottom of the countercurrent column, as illustrated in Figs. 5 and 6, the small openings in the water-inlet pipes having downwardly depending surrounding cylinders, as illustrated in Fig. 6, and in dotted lines at 71 in Fig. 11, and the outer larger pipes 70 having slotted openings at the bottom, such as illustrated in Fig. 6.

In order to insure uniform discharge of water through the different pipes into the bottom of the tower each water inlet pipe 17 is provided with a flange orifice 73 located between flanges 74 and 75, these orifices being predetermined and suitable for insuring a proper flow of water to the bottom of the desweetening column so as to obtain a substantially uniform distribution of water over the bottom of the tower and so as to obtain uniform distribution of the upwardly flowing water in the column. These flange orifices are similar to those shown at 56 in Fig. 5.

The desweetening tower 16 has two side inlets 26 and 27, leading from the liquor space above the top of the body of adsorbent material and from the column below the top of this body, and these are connected to a differential pressure cell 28, the arrangement being similar to that of the cell 28 in Figs. 2 and 3, and such as to permit determination and regulation of the level of adsorbent in the tower.

The bottom of this desweetening tower is conical in shape and leads to the outlet 19, which is connected through the full opening valve 20 with a lower cylindrical portion 21 from which the upwardly extending pipe 22 carries the slurry of adsorbent, after desweetening, to the filter. Sample lines 25 are located at different levels in this tower, with pipes extending inwardly to permit the drawing off of samples of the liquid therein.

Figs. 12a, 12b, and 12c illustrate the flow rate in gallons per minute, in a column 9'6" in diameter, of thick beet sugar juice from the evaporators at a concentration of between 50–55 R.D.S. (refractometrically determined solids), at temperatures respectively of 90° C., 85° C. and 80° C. with the gallons per minute shown on a log scale.

At 80a, 80b, and 80c is shown the approximate minimum flow rate curve below which an expanded bed is not maintained. At 81a, 81b, and 81c, is shown the approximate maximum flow rate curve in gallons per minute for maintaining an expanded bed. At 82a, 82b, and 82c is shown in dotted lines the approximate flow rate in gallons per minute for producing a turbulent flow or a fluidized bed. In operation, in the column of the diameter indicated, a rate of flow should be maintained at an intermediate point above the minimum flow rate curve and not exceeding the maximum flow rate curve, and with avoidance of a rate which will produce a turbulent mass or a fluidized bed.

The flow rates are rates in the carrying out of the process with an adsorbent of the kind previously referred to, namely, the adsorbent CAL.

Figs. 13 to 16 show a modified form of construction of the top of one of the countercurrent columns, and a modified arrangement for supplying the adsorbent thereto in a slurry form.

In this modification the top of the countercurrent column is indicated at 100, this corresponding to the top of the column 1 of Fig. 3, but differing therefrom.

The column 100 is shown as having an open top 101, or the top cut away. At the outlet level of the sugar solution an annular trough 102 is arranged and secured to the wall of the column, and has a series, shown as 3, inwardly extending trough members 103 connected to the trough 102 at their outer ends, and welded together and to the plate 129 at their inner ends, and with supporting brackets 104. The trough members 103 have overflow notches 105 through which the sugar solution overflows into the trough. The sugar outlet from the trough 102 is through the pipe 106.

Within the upper portion of the column are two concentric cylinders 107 and 108 which form an annular space 109 between them, which extends up above the liquid level in the column and down below the liquid level to an extent similar to that of the soaking chambers of Fig. 3. These cylinders are supported by the troughs 103, which extends through them and are welded to them. Roofs 110 cover the troughs where they pass through the annular space between cylinders to prevent adsorbent material, flowing downwardly through the annular space, from entering the overflow troughs.

At the top of the column of Fig. 13 is shown means for supplying the adsorbent, mixing it with purified sugar solution to form a slurry and for supplying the slurry to the column. Located above the column is a rotating distributing pipe 111 which discharges the slurry into the annular space between the two cylindrical members. This distributing pipe is rotated by a gear shown conventionally at 112, driven by a small gear 113, the arrangement being such as to cause the pipe 111 to rotate gradually and feed the slurry to the annular space during its rotation. The slurry is formed in the slurry chamber or sluice chamber 115 and passes through the line 114 to the rotating distributing pipe 111.

The adsorbent material, such as CAL, can be returned from the regenerating furnace in a slurry in water through the line 116 to a vibrating screen 117 to remove water from the adsorbent, which is drawn off through the line 118. The adsorbent, freed from most of its water, discharges into the hopper 119 which is open at the bottom and located just above the belt feeder 120 which withdraws adsorbent from the bottom of the hopper and discharges it into the slurry or sluice chamber 115, to which purified sugar solution is added through the line 121 to form a slurry of the adsorbent, which then passes downwardly and is distributed to the annular space in the column through the rotating distributing pipe.

The rate at which the adsorbent is supplied to the top of the column can be regulated by regulating the speed of the belt feeder 120, and the amount of purified sugar solution used to form the slurry can be regulated through the line 121.

The purified sugar solution used for making the slurry with the regenerated adsorbent is advantageously a portion of the purified sugar solution coming off from the top of the column. The return of purified sugar solution in the slurry aids in the spreading out of the adsorbent over the top of the column, and the returned sugar solution will be removed from the top of the column with the normal overflow.

The operation of the modified form of the column illustrated in Figs. 13 to 16 is in general similar to that described in connection with the operation of the column shown in Fig. 3, as previously described. The operation differs in the arrangement for withdrawing the purified sugar solution from the top of the column and for supplying the adsorbent to the top of the column.

Figure 17:
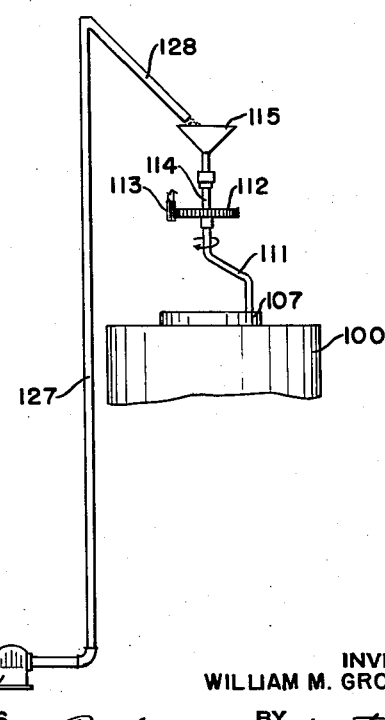
Fig. 17 shows a modified arrangement for supplying the adsorbent in slurry form to the top of a column such as illustrated in Fig. 13.

In Fig. 17 a further modification is shown, in a somewhat conventional and diagrammatic manner, for supplying adsorbent to the top of the column in slurry form.

In Fig. 17 a hopper or supply 122 is provided for the regenerated and cooled adsorbent. This hopper has an open bottom located slightly above the belt feeder 123 which conveys the adsorbent from the hopper 122 and discharges it into a slurry chamber 124 to which purified sugar solution is added through the pipe 125 to form a slurry of the adsorbent material. From the slurry chamber 124 the slurry is pumped by double diaphragm pumps 126 through the line 121, and the downwardly extending portion 128 of this line into the slurry or juice chamber 115, which is similar to that shown in Fig. 13, and supplies the slurry in a similar way to the column 100 which is shown conventionally in Fig. 17 and is similar to the column 100 of Fig. 13.

The arrangement of Fig. 17 enables the regenerated adsorbent, or the fresh adsorbent, to be supplied in dried granular form, with regulation of the rate of supply controlled by the belt feeder 123. The making of the adsorbent into a slurry, and the use of diaphragm pumps, enables the slurry to be carried to the top of the column, and discharged into the feeding device at the top of the column.

In the apparatus illustrated in Fig. 13, where the regenerated adsorbent is returned in the slurry with the water, the removal of most of the water by a filter or vibrating screen will still leave some water wetting the adsorbent as it is formed into a slurry with the purified sugar solution and supplied to the top of the tower. The arrangement of Fig. 17 has the advantage that the dry adsorbent can be made into a slurry and pumped in slurry form to the top of the column. The adsorbent in this case is thoroughly wet with the pumped sugar solution, and the air and other gases removed therefrom before it enters the column. And the dilution of the adsorbent by the sugar solution in the slurry aids in the spreading out of the adsorbent as it passes downwardly through the sugar solution in the annular space and then through the sugar solution in the column below the annular chamber.

The following is given as an example of typical operation of such a column as that described in the accompanying drawings, for the removal of floc-forming materials from beet sugar liquor.

In a column 9½ feet in diameter, with a 36-foot cylindrical vertical section and an 8-foot conical bottom, and with a working bed height of 30 feet of expanded bed of adsorbent material above the sugar inlet, the column is fed with 52 R.D.S. thick juice at 90° C. and at a rate of 60 gallons per minute. Of this, only a minor fraction, about ½ gallon per minute, is utilized for adsorbent removal to the solids removal system.

The 59.5 gallons per minute of sugar solution passing upwardly through the column is equivalent to a superficial velocity of about 6.7 feet per hour in an empty column, or approximately 13.4 feet per hour actual velocity in an adsorbent bed having about 50% voids. Thus, the liquor takes about 2¼ hours to pass up through the bed.

The adsorbent feed is varied with the floc content of the feed liquor. When light floc is found in the feed, the adsorbent feed may be as low as 66 pounds per hour. For sugar solutions with a heavy floc-forming content, the adsorbent may be fed with a feed rate of around 210 pounds per hour.

Once the column has been placed in operation, with recycling of the effluent sugar solution until a floc-free solution is obtained, and the break-through point is about 15 feet up the column from the sugar inlet, the column can be continued in operation with a sufficient safety factor of column above the break-through point to take care of sudden surges in floc content. Testing of the sugar solutions taken off at different levels of the column, even though some delay is involved in testing them, will enable the rate of adsorbent feed to be adjusted to maintain the break-through point at an intermediate portion of the column, and safely below the top of the adsorbent bed.

I claim:

1. The method of treating beet sugar solutions in a continuous manner to remove floc-forming materials therefrom which comprises passing the hot sugar solution upwardly through an elongated vertical column countercurrent to a downwardly flowing bed of granular floc-forming-material-adsorbent carbon, continuously supplying the hot sugar solution to the bottom of said column with uniform distribution of the sugar solution over the cross-sectional area of the bed, causing the hot sugar solution to flow upwardly as a substantially lineal ascending column of sugar liquor through the downwardly flowing bed at a rate to maintain said bed of adsorbent in an expanded state as a substantially lineal descending column of expanded adsorbent, maintaining a body of purified sugar solution above said bed, supplying adsorbent through the body of purified sugar solution to obtain a substantially uniform distribution of the adsorbent to the top of the bed and withdrawing spent adsorbent from the bottom of the bed, taking samples at intermediate points in the bed and testing to determine the break-through point beyond which the sugar solution is free from floc-forming materials, maintaining a sufficient length of countercurrent flow of the sugar solution and rate of adsorbent supply to effect the removal of floc-forming materials well below the top of the bed and withdrawing the purified sugar solution uniformly from said body of sugar solution above the bed.

2. The method according to claim 1 in which the spent adsorbent is withdrawn from the bottom of the bed as a slurry in sugar solution.

3. The method according to claim 1 in which the adsorbent is supplied in dry form through a series of liquid containing zones extending into a body of sugar solution above the countercurrent bed and discharging into said body of sugar solution above the top of said bed.

4. The method according to claim 1 in which the adsorbent is supplied in the form of a slurry and distributed over the surface of the countercurrent bed.

References Cited in the file of this patent

UNITED STATES PATENTS

| 2,763,580 | Zabor | Sept. 18, 1956 |
| 2,822,304 | Gillmore | Feb. 4, 1958 |

OTHER REFERENCES

Sugar, March 1952, pp. 35–38.
But: Supr. Technology, by McGinnis, 1951, pp. 278–279 and 283–289.

UNITED STATES PATENT OFFICE
CERTIFICATE OF CORRECTION

Patent No. 2,969,297                                        January 24, 1961

William M. Grosvenor, Jr.

It is hereby certified that error appears in the above numbered patent requiring correction and that the said Letters Patent should read as corrected below.

Column 9, line 30, strike out "char"; line 45, for "bone char" read -- adsorbent --; same column 9, line 68, strike out "bone".

Signed and sealed this 19th day of June 1962.

(SEAL)
Attest:

ERNEST W. SWIDER
Attesting Officer

DAVID L. LADD
Commissioner of Patents